May 8, 1956   L. GOLDSTEIN ET AL   2,745,072
WAVE GUIDE GAS SWITCHING DEVICE
Filed Feb. 18, 1952   2 Sheets-Sheet 1
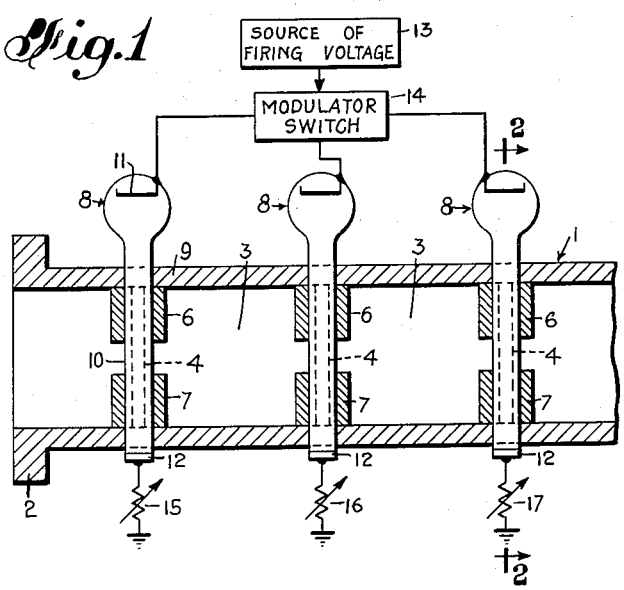
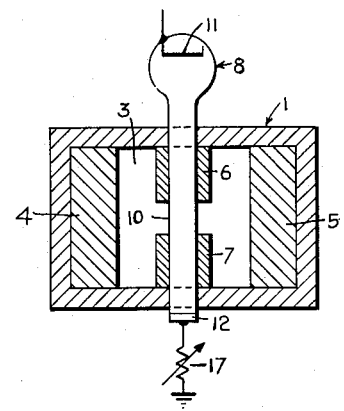
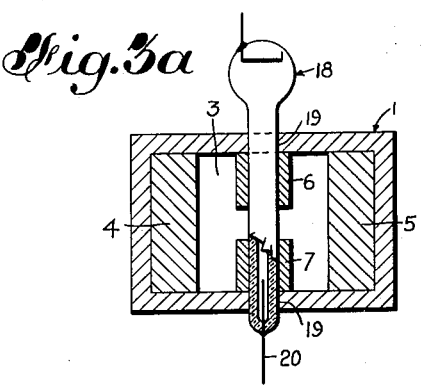
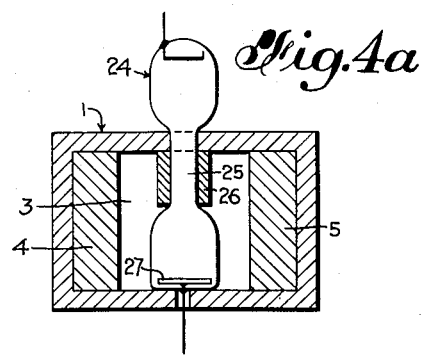
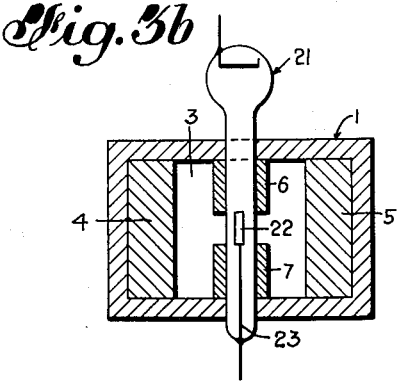
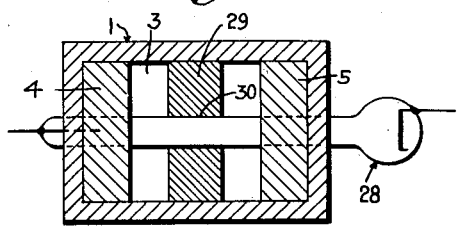
INVENTORS
LADISLAS GOLDSTEIN
DONALD J. LEVINE
WILLIAM SICHAK
BY
ATTORNEY May 8, 1956 L. GOLDSTEIN ET AL 2,745,072
WAVE GUIDE GAS SWITCHING DEVICE
Filed Feb. 18, 1952 2 Sheets-Sheet 2

INVENTORS
LADISLAS GOLDSTEIN
DONALD J. LEVINE
WILLIAM SICHAK
BY
ATTORNEY

United States Patent Office 2,745,072
Patented May 8, 1956

2,745,072
WAVE GUIDE GAS SWITCHING DEVICE

Ladislas Goldstein, Urbana, Ill., Donald J. Levine, New York, N. Y., and William Sichak, Lyndhurst, N. J., assignors to International Telephone and Telegraph Corporation, a corporation of Maryland Application February 18, 1952, Serial No. 272,236

12 Claims. (Cl. 333—98)

This invention relates to switching devices and more particularly to a gas switching device for controlling the propagation of electromagnetic energy through a hollow waveguide or similar structure capable of conveying energy of the general character indicated.

The use of a gas discharge in combination with hollow conducting waveguides has become common practice due to the peculiarly suitable characteristics of gas discharges at ultra-high frequencies. When a gas discharge is created in a resonant structure, it detunes the structure, and thus the electromagnetic wave energy propagated therethrough is either absorbed and/or reflected. If very little energy is lost when the gas discharge device is in its unfired state, the device may act as a switch alternately permitting and preventing the transfer of energy through the resonant structure. Heretofore, rapid operation of such or similar switch was obtained by utilizing relatively high R. F. energy coupled to the cavity resonator to produce an electron gas by creating a gaseous discharge and thus detuning the cavity. In many applications a switch capable of controlling electromagnetic wave energy over a wide frequency band and having a rapid operation cycle controlled from an external source has been desired.

One of the objects of this invention, therefore, is to provide an attenuator tube capable of rapid operation over a wide frequency range.

Another object of this invention is to provide a gas switching device capable of attenuating large amounts of ultra-high frequency energy when fired and causing low losses of energy when unfired.

A further object of this invention is to provide a gas switching device capable of being activated by external means to pass or stop low powered signals for a predetermined time duration.

According to a feature of this invention, electromagnetic wave energy is propagated through a plurality of planar resonant structures so designed that they are broad band over the desired frequency range. An externally controlled gas discharge is passed through each resonant structure by means of a discharge tube to detune the resonant structure causing the energy to be attenuated by absorption and/or reflection.

Another feature of this invention is the combining of the plurality of tubes into one structure which is run in series, "snake," fashion through the resonant structures with a single anode and cathode structure.

A further feature of this invention utilizes a single cathode structure and gas reservoir but has a plurality of discharge tubes, each tube having a separate anode.

The above-mentioned and other features and objects of this invention and the manner of attaining them will become more apparent by reference to the following description taken in conjunction with the accompanying drawings, in which:

Fig. 1 is a longitudinal sectional view of one form of switching device in accordance with the principles of this invention;

Fig. 2 is a cross-sectional view taken along lines 2—2 of Fig. 1;

Figs. 3a and 3b are cross-sectional illustrations of various tube structures for increasing the electron density of the gas discharge contained therein;

Figs. 4a and 4b are cross-sectional illustrations of alternate positions of the discharge tube in a resonant structure which permit greater interaction between the electromagnetic field of the resonant structure and the gas discharge;

Figure 5:
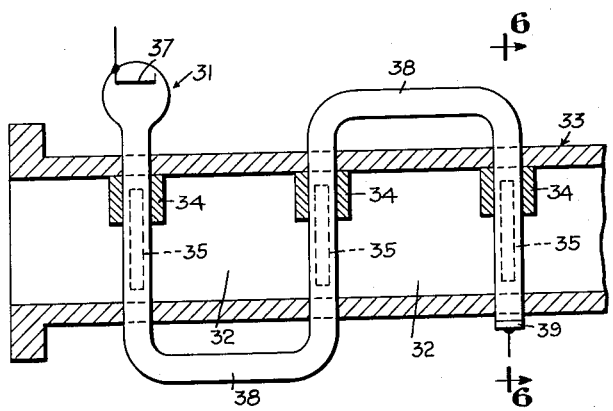
Fig. 5 is a longitudinal sectional view showing a modified form of gas switching device in accordance with the principles of this invention.

Referring to Figs. 1 and 2, a gas switching device in accordance with the principles of this invention is shown comprising an energy transmission system capable of supporting a single mode, here shown for purposes of explanation in the form of a hollow rectangular waveguide 1 terminated at each end by a bolt flange 2 to permit easy insertion in a waveguide energy transmission system. The waveguide 1 is divided into a plurality of resonant structures 3. Each resonant structure 3 comprises inductive iris diaphragms 4 and 5 positioned in substantially the same plane as hollow capacitive posts 6 and 7. Gas discharge device 8 are extended through an opening in the waveguide wall 9 and through the center of the posts 6 and 7 traversing each resonant structure 3. As will be understood by those versed in this art, R. F. chokes may be utilized to reduce R. F. leakage from the energy transmission system. In referring to the hollow rectangular waveguide, a cross section may be considered taken through the resonant structure and waveguide in a direction transverse to the direction of propagation of the electromagnetic wave. The axis parallel to the longer sides of this rectangular cross section is here designated as the major axis. This major axis is substantially parallel to the magnetic field set up in the wave guide cross section. The axis parallel to the shorter side of the rectangular cross section is designated as the minor axis. This minor axis is substantially parallel to the electric field set up in the waveguide.

The gas discharge devices 8 comprise an elongated envelope 10 containing an ionizable medium. A cathode structure 11 is provided at one end of the gas discharge tube 8. An anode structure 12 is disposed in opposition to the cathode 11 and terminates the envelope 10. One form of anode 12 which we have found satisfactory consists of a glass to metal seal. The cathode 11 of each device is coupled to a source of firing voltage 13 which is controlled by a switch 14. The anode 12 of each tube 8 is coupled through current limiting and/or isolating resistors 15, 16, and 17 which are so adjusted that when a firing voltage is applied to a discharge tube 8, they prevent one tube from igniting prior to the others and thus preventing the ignition of the other tubes.

In order to properly function as a broad frequency band switch, this device must have low Q properties, such as are provided by a multisection filter wherein each resonant structure 3 is mounted substantially a quarter wavelength apart. We have found that the Q of the resonant structures of this device cannot be predicted from elementary tuned circuit theory because of the coupling between the inductive iris diaphragms 4 and 5 and the hollow capacitive posts 6 and 7. The Q of the resonant structure for a given frequency range must be determined empirically. The higher the Q of the resonant structure, the greater are the losses at the edges of the frequency band. If more than one resonant structure is used, the current per tube may be less for the same hot tube loss but each section would call for a lower Q to keep the band edge loss low. The limiting case would be a long series of low Q tubes cascaded, each drawing low current, that is, the greater the volume of resonant gas structures acting upon the energy, the less current needed and the lower the required Q per structure. This type of structure would have greater dissipation and have poorer reflection properties aside from being quite long physically.

To detune the resonant structures 3, susceptance elements whose properties are changed as a function of time are required. Gas discharge tubes are ideally suited for this function, but they require a high electron density if the Q of the resonant structure is low. To supply the high electron densities required in this device (approximately $10^{15}$ electrons per cubic centimeter), we have found that the rare gases, such as xenon or argon, at a pressure of approximately 10 millimeters Hg are most suitable. If it is desired to decrease the deionization time of the gas discharge, small amounts (i. e. less than 0.1 per cent) of water vapor may be added to the gas. The power necessary to maintain the required electron density can be spent in a gas discharge either from a D. C. source of from an A. C. source (including R. F. sources). If ionization of the gas to proper electron density is to be produced and maintained with small current densities, say of the order of $10^{-3}$ amperes, then obviously we need a high voltage device. To decrease the voltage requirements, it would probably be useful to operate the gas tube with a keep-alive voltage or to include a radioactive or photo emissive source within the tube.

We have also found that various tube structures will provide a greater density of electrons for a given current which thus results in a reduced current drain, high reflection losses and lower dissipative losses. Figs. 3a and 3b illustrate cross sections of various gas discharge tube structures in accordance with the principles of this invention to obtain increased electron densities in the resonant structures heretofore described.

Fig. 3a illustrates a gas discharge tube 18 having an outside diameter substantially equal to the gas discharge tube 8 illustrated in Fig. 1. However, the inside diameter is made smaller to increase the electron densities. The tube 18 extends through openings 19 in the waveguide 1 and is terminated by an anode structure 20. The tube 21 illustrated in Fig. 3b contains a dielectric rod 22 composed of a material such as glass. The rod 22 confines the gas discharge to a reduced cylindrical volume between the rod 22 and the tube envelope 21 extending between the end of posts 6 and 7, which is the effective volume of the gas discharge. An anode 23 may be utilized to support the rod 22.

Figs. 4a and 4b illustrate tube positions in the resonant structures which permit greater interaction between the R. F. field and the gas discharge, thus producing a greater detuning effect for a given current drain. Tube 24 of Fig. 4a has a slender portion 25 passing through the waveguide 1 and the capacitive post 26. The portion of tube 24 disposed beyond the post 26 has a greater diameter than the tube neck 25, thus increasing the ratio of the tube surface to tube volume. The tube 24 is terminated by an anode 27 which consists of a metal plate sealed to the envelope.

Positioning the gas discharge tube parallel to the major transverse axis as shown in Fig. 4b also permits a greater interaction between the R. F. field and the gas discharge. We have found that when the tube 28 is positioned in this manner, best results are obtained if the resonant structure is modified. A solid post 29 is centered in the cavity and has a hole 30 through which the gas discharge tube 28 is extended transversely of the resonant structure.

Figure 6:
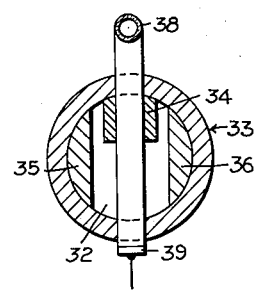
Fig. 6 is a cross-sectional view taken along lines 6—6 of Fig. 5.

Referring to Figs. 5 and 6, a modified form of a gas switching device in accordance with the principles of our invention is shown wherein one gas discharge tube 31 is utilized to detune a plurality of resonant structures 32. The energy transmission system here shown comprises a circular waveguide 33. Each planar resonant structure comprises an asymmetrical capacitive post 34 and inductive iris diaphragms 35 and 36. An annular ring may be utilized in place of the iris diaphragms 35 and 36. The gas discharge tube 31 comprises a cathode structure 37, gas discharge tube 38, and anode structure 39. The tube is "snaked" through the hollow posts 34 of each resonant structure 32 to provide a path for the gas discharge created by applying a voltage to the cathode 37 and anode 39. The volume of gas discharge contained within each cavity 32 is the same as in the device of Fig. 1, thus having the same detuning effect; but due to the greater distances between the cathode 37 and anode 39, a higher ionization potential is required. In this device there is no danger of a gas discharge being present in one structure before the others fire since one tube 31 provides the discharge for all the resonant structures.

Figure 7:
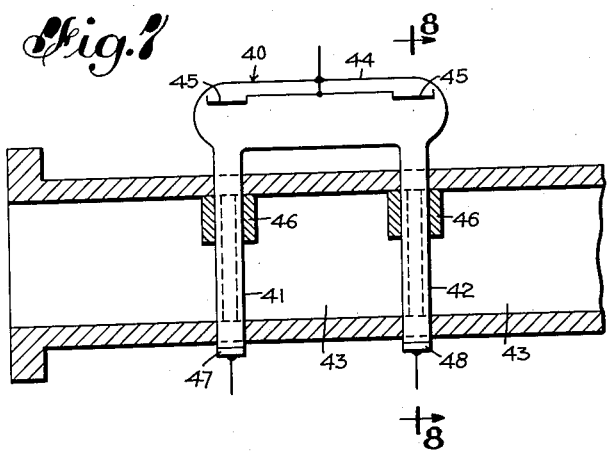
Fig. 7 is a longitudinal sectional view showing an additional embodiment of the gas switching device of this invention.
Figure 8:
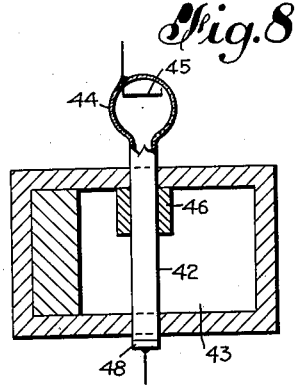
Fig. 8 is a cross-sectional view taken along lines 8—8 of Fig. 1.

Still another form of gas switching device in accordance with the principles of our invention is shown in Figs. 7 and 8 wherein one gas discharge device 40 is used having a capillary discharge tube 41 and 42 in each resonant structure 43. The gas discharge device 40 comprises a common gas reservoir 44 and a cathode structure 45. Elongated tubes 41 and 42 extend from the cathode structure 45 through the hollow asymmetrical capacitive posts 46 traversing each resonant structure 43 and terminating in anode structures 47 and 48. If a comparatively large gas reservoir is provided, there is little chance of one tube firing before the other, however, if a small gas reservoir is provided, current limiting and/or isolating resistors may be added to the anode circuit as in Fig. 1 to insure simultaneous firing of all tubes.

While we have shown rectangular waveguides in Figs. 1 through 4b, 7, and 8 and a circular waveguide in Figs. 5 and 6, it will be understood, of course, that circular, rectangular, or any other waveguide shape which supports a single mode may be employed. Furthermore, the capacitive post arrangement as well as the iris arrangement may be either symmetrically or asymmetrically disposed with respect to the direction of propagation of the electromagnetic wave as may be desired.

While we have described the principles of our invention in connection with specific apparatus, it is to be clearly understood that this description is made by way of example only and not as a limitation to the scope of our invention as set forth in the objects thereof and in the accompanying claims.

We claim:

1. A switching device comprising a waveguide of a hollow type containing a plurality of spaced apart resonant structures disposed transversely to the direction of propagation of an electromagnetic wave within said waveguide, each said resonant structure including a conductive inductive iris, a conductive capacitive post and a gas discharge tube section, and means to control substantially simultaneously and independently of electromagnetic radio-frequency energy propagated through said waveguide the ionization of the gas contained in the tube sections of said structures.

2. A switching device according to claim 1 wherein said post is hollow and said tube section is extended through said post.

3. A switching device according to claim 2 wherein said device includes a plurality of gas discharge units each having an elongated dielectric envelope, each said envelope containing a cathode structure, an anode disposed in spaced relation to said cathode and an ionizable medium.

4. A switching device according to claim 3 wherein said elongated dielectric envelope includes a rod of dielectric material contained within and axially of the elongated portion of said envelope.

5. A switching device according to claim 3 wherein a portion of the said elongated dielectric envelope is of a smaller diameter than the remainder of said elongated envelope, that portion traversed by said electromagnetic wave being of substantially larger diameter than that portion disposed within said hollow post.

6. A switching device according to claim 1 wherein said conductive iris includes at least one metallic diaphragm lying in a plane substantially transverse to the direction of wave propagation therethrough and said post having its central axis in the same plane as said diaphragm and parallel to the minor axis of the waveguide cross section.

7. A switching device according to claim 6 wherein said post is hollow and said tube section is extended through said post.

8. A switching device according to claim 1 wherein each of said resonant structures includes a pair of metallic diaphragms lying in a plane substantially transverse to the direction of wave propagation therethrough and a pair of aligned hollow posts the axis of which lies in said plane and is parallel to the minor axis of the waveguide cross section and wherein said gas discharge tube section extends through said pair of hollow posts.

9. A switching device according to claim 1 wherein the axis of each of said gas discharge tube sections traverses said resonant structure substantially parallel to the major axis of a transverse section of said waveguide.

10. A switching device comprising a waveguide of the hollow type containing a plurality of spaced apart resonant structures disposed transversely to the direction of propagation of an electromagnetic wave within said waveguide and a gas discharge unit having an elongated dielectric envelope, said envelope containing a cathode, an anode and an ionizable medium, said elongated dielectric envelope being shaped to provide a plurality of sections, one each transversing one of said resonant structures.

11. A switching device according to claim 10 wherein the axis of each of said sections traversing each of said resonant structures is substantially parallel to the minor transverse axis of each of said resonant structures.

12. A switching device comprising a waveguide of the hollow type containing a plurality of spaced apart resonant structures each including a conductive inductive iris and a conductive capacitive post disposed transversely to the direction of propagation of an electromagnetic wave within said waveguide, and a gas discharge unit having a dielectric envelope, said envelope containing a cathode, a plurality of anodes and an ionizable medium, and said envelope having a plurality of gas discharge tube sections, each said section traversing one of the plurality of said resonant structures and terminating in one of the anodes of said gas discharge unit, said gas discharge unit including means to provide for a simultaneous ionization of the gas contained in the tube sections of said resonant structures and for control independent of the electromagnetic radio-frequency energy propagated through the waveguide.

References Cited in the file of this patent

UNITED STATES PATENTS

| 2,415,242 | Herschberger | Feb. 4, 1947 |
| 2,505,534 | Fiske | Apr. 25, 1950 |
| 2,557,180 | Fiske | June 19, 1951 |
| 2,567,701 | Fiske | Sept. 11, 1951 |
| 2,644,926 | Varela | July 7, 1953 |

OTHER REFERENCES

Ragan: Microwave Transmission Circuits, vol. 9, Radiation Laboratory Series, pages 688–690.